US010745591B2

(12) United States Patent
Tillack et al.

(10) Patent No.: US 10,745,591 B2
(45) Date of Patent: Aug. 18, 2020

(54) METHOD FOR ADHESIVELY BONDING SUBSTRATES USING ADHESIVES

(71) Applicant: Covestro Deutschland AG, Leverkusen (DE)

(72) Inventors: Jörg Tillack, Solingen (DE); Dirk Achten, Leverkusen (DE); Wolfgang Arndt, Dormagen (DE); Roland Wagner, Leverkusen (DE); Martin Melchiors, Leichlingen (DE); Cornelia Steck, Oberhausen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/562,636

(22) PCT Filed: Apr. 7, 2016

(86) PCT No.: PCT/EP2016/057571
§ 371 (c)(1),
(2) Date: Sep. 28, 2017

(87) PCT Pub. No.: WO2016/162394
PCT Pub. Date: Oct. 13, 2016

(65) Prior Publication Data
US 2018/0105722 A1    Apr. 19, 2018

(30) Foreign Application Priority Data

Apr. 7, 2015  (EP) .................... 15162616

(51) Int. Cl.
| C09J 5/02 | (2006.01) |
| C09J 5/04 | (2006.01) |
| C09J 5/06 | (2006.01) |
| A43D 25/20 | (2006.01) |
| A43B 9/12 | (2006.01) |
| B32B 7/12 | (2006.01) |
| B32B 27/30 | (2006.01) |
| C08G 18/08 | (2006.01) |
| C08G 18/28 | (2006.01) |
| C08G 18/62 | (2006.01) |
| C08G 18/70 | (2006.01) |
| C08G 18/79 | (2006.01) |
| C08G 18/80 | (2006.01) |

(52) U.S. Cl.
CPC ...................... *C09J 5/02* (2013.01); *A43B 9/12* (2013.01); *A43D 25/20* (2013.01); *B32B 7/12* (2013.01); *B32B 27/30* (2013.01); *C08G 18/0828* (2013.01); *C08G 18/283* (2013.01); *C08G 18/6254* (2013.01); *C08G 18/706* (2013.01); *C08G 18/792* (2013.01); *C08G 18/798* (2013.01); *C08G 18/807* (2013.01); *C09J 5/04* (2013.01); *C09J 5/06* (2013.01); *C09J 2475/00* (2013.01)

(58) Field of Classification Search
CPC ........ C09J 5/04; C09J 5/02; C09J 5/06; B32B 2037/1269; A43D 25/20; A43B 9/12; C09G 18/0828; C09G 18/283; C09G 18/6254; C09G 18/706; C09G 18/792; C09G 18/798; C09G 18/807
USPC ........................................ 156/310, 314–319
See application file for complete search history.

(56) References Cited

U.S. PATENT DOCUMENTS

| 3,635,870 | A | 1/1972 | Thoma et al. |
| 3,640,937 | A | 2/1972 | Thoma et al. |
| 3,658,746 | A | 4/1972 | Rosendahl et al. |
| 4,295,910 | A | 10/1981 | Cooley et al. |
| 4,663,377 | A | 5/1987 | Hombach et al. |
| 4,808,691 | A | 2/1989 | Konig et al. |
| 5,096,994 | A | 3/1992 | Schmalstieg et al. |
| 5,252,696 | A | 10/1993 | Laas et al. |
| 5,914,383 | A | 6/1999 | Richter et al. |
| 6,426,414 | B1 | 7/2002 | Laas et al. |
| 6,767,958 | B2 | 7/2004 | Laas et al. |
| 7,641,759 | B2 * | 1/2010 | Norling ................... B32B 37/12 |
|  |  |  | 156/310 |
| 2008/0178986 | A1 * | 7/2008 | Siavoshani ................ C09J 5/06 |
|  |  |  | 156/73.1 |

FOREIGN PATENT DOCUMENTS

| CA | 1061043 | 8/1979 |
| DE | 269626 A1 * | 7/1989 |
| DE | 10007821 A1 | 8/2001 |
| EP | 0058300 A1 | 8/1982 |

(Continued)

OTHER PUBLICATIONS

Machine translation of DD 269626 date unknown.*

(Continued)

*Primary Examiner* — John L Goff, II
(74) *Attorney, Agent, or Firm* — Richard P. Bender

(57) ABSTRACT

The present invention relates to a method for adhesively bonding substrates, said method comprising the following steps: I) at least one adhesive component (a) and at least one isocyanate component (b) are applied between at least two substrates; II) the substrates are pressed together. The method is characterized in that in step I), the adhesive component and the isocyanate component are applied separately to the substrate. The invention further relates to a composite obtained according to said method. In a preferred embodiment, an aqueous polyurethane dispersion or a polyurethane solution in organic solvents is used as the adhesive component.

10 Claims, No Drawings

(56) References Cited

FOREIGN PATENT DOCUMENTS

| | | |
|---|---|---|
| EP | 0649866 A1 | 4/1995 |
| EP | 0916647 A2 | 5/1999 |
| GB | 1145952 | 3/1969 |
| WO | 9815601 A1 | 4/1998 |

OTHER PUBLICATIONS

Laas, et al, The Synthesis of Aliphatic Polyisocyanates Containing Biuret, Isocyanurate or Uretdione Backbones for Use in Coatings, J. Prakt. Chem. 336, (1994), pp. 185-200.
Ullmann's Encyclopädie der technischen Chemie, 4th edition, vol. 19, Verlag Chemie, Weinheim, pp. 31-38.
H. Bartl et al, Methoden der organischen Chemie (Houben-Weyl) 4th Edition, vol. E20, Stuttgart, New York, Thieme, 1987, pp. 1671-1682.
E.P. Chang, Viscoelastic Windows of Pressure-Sensitive Adhesives, The Journal of Adhesion 34(1-4), (1991), p. 189-200.

\* cited by examiner

METHOD FOR ADHESIVELY BONDING SUBSTRATES USING ADHESIVES

CROSS REFERENCE TO RELATED APPLICATIONS

This application is a national stage application under 35 U.S.C. § 371 of PCT/EP2016/057571, filed Apr. 7, 2016 which claims benefit of European Application No. 15162616.5, filed Apr. 7, 2015 and which are incorporated herein by reference.

FIELD OF THE INVENTION

The present invention relates to a method for adhesively bonding substrates using an adhesive component and an isocyanate component. The invention further relates to an assembly obtainable by this method.

BACKGROUND OF THE INVENTION

Adhesives are thermoplastic polymers, frequently in solution, which are applied to a first substrate and after drying are present on the substrate in a tacky form, either directly or else after heat activation. After pressing with a second substrate, which either is uncoated or has likewise been provided with a layer of adhesive beforehand, the two substrates are joined to one another. With certain heat-activated adhesives, the cooling process is accompanied by crystallization, which enhances the properties of the bonded joint.

Since the systems described above comprise thermoplastic polymers, the bonded joint can be softened again by heating, and the substrates can be parted from one another again.

The thermoplastic behavior of the adhesives leads to problems in some cases. For instance, the sensitivity of the substrates may not tolerate a particularly high activation temperature whereas temperatures above the softening point of the adhesive are encountered in the application, and this could result in unintended separation of the substrates during the application.

An example here would be the adhesive bonding of footwear soles. In the case of sports footwear especially, crystallizing, aliphatic polyurethane dispersions are often used. The activation temperature is normally 80° C. Bonded joints produced with such adhesives then subsequently have a heat resistance of around 60° C. The footwear industry, however, demands much higher heat resistances here, since on a fairly frequent basis, the sports footwear is washed in the washing machines at temperatures of 60° C. or more, and delamination of the sole is to be ruled out.

An increase in the heat stability may be achieved, for example, through the use of 2-component (2K) adhesives. 2K adhesives are adhesives wherein the components, (a) adhesive component and (b) crosslinker component, must be stored in separate vessels on account of their reactivity. The state of the art is that the two components are mixed shortly before application and immediately begin to react with one another, generally without additional activation. Polyisocyanates are frequently employed as a crosslinker component. Systems and methods of this kind are described in EP 0 206 059 A, for example.

Disadvantages of this method are:

The cost and effort involved in mixing.

After mixing, the system reacts directly. This results in a limited working time and may entail additional waste if the mixture is not consumed within the restricted working time.

In the case of aqueous systems, it is impossible in some cases to observe the progress of the working time, since the viscosity remains constant and the polyisocyanate is consumed by reaction with the water to form urea particles. This may mean that the heat stability is not increased as planned.

Articles which come into contact with the mixed material (e.g., brushes) must frequently be cleaned and ultimately replaced.

The reactivity of the blended mixtures frequently results in instances of fouling, particularly with non ideal processing conditions, and instances of clogging of the application assemblies, particularly when using rolls, extruders or spraying heads, and hence results in poor-quality adhesive-application outcomes and increased cleaning cost and labor.

Attempts have already been made to solve at least part of these problems by means of a method wherein the components are mixed in the spraying jet. In terms of their apparatus, however, the construction of these methods is so complex that they are only suitable for use on a laboratory scale. Industrial-scale establishment is hardly possible, or is possible only with very great complexity and high costs, since the precise conditions required for the components to experience sufficient mixing in the spraying jet itself cannot be ensured under ambient conditions and over relatively long sections.

DETAILED DESCRIPTION OF THE INVENTION

The object was therefore to develop a process by means of which bonded joints having the good heat stability of a conventional 2K adhesive can be produced, and which has none of the disadvantages described above.

This object has been achieved in accordance with the invention by means of a method for adhesively bonding substrates, comprising the following steps:

I) at least one adhesive component (a) and at least one isocyanate component (b) are applied between at least two substrates;

II) the substrates are pressed against one another;

characterized in that in step I) the adhesive component (a) and the isocyanate component (b) are applied separately to the substrate.

Surprisingly it has been found that it is possible to apply the components of a 2K adhesive separately in such a way that the components strike the substrate only after having left the application apparatus (e.g., roll, extruder, spray gun, printing head, dispenser), without any significant detraction from the adhesive function relative to premixed 2K adhesives. Entirely unexpectedly, even after complete drying of the adhesive component (a), it has been possible to apply an isocyanate component (b) to the dried layer without thereby significantly detracting from the adhesive function relative to premixed 2K adhesives made up, for example, of the same components. Drying is understood in the sense of this invention to be the removal of volatile constituents and/or the cooling of the adhesive component to below its solidification point (melting point or glass transition point in the case of thermoplastics, possibly after crystallization). As is also customary with 2K adhesives, subsequent to the application of the two components, the two substrates are pressed together (optionally after heat activation in the case of heat-activatable adhesives). The method of the invention produces a bonded system whose heat stability corresponds very largely to that of a premixed system (state of the art).

In the sense of the invention, separately applied means that the adhesive component and the isocyanate component are not mixed with one another before and during the application. It is only on the substrate that the components come into contact with one another, and make contact at one interface at least.

Suitability as adhesive component (a) is possessed by all typical adhesives which, as is known, can be implemented in 2K methods with isocyanates, or 1-component (1K) adhesives which can be post-crosslinked with isocyanates. Typical adhesive raw materials for component (a) include the following: polyvinyl acetates, acrylates, polyurethanes, polyesters, polyethers, polycarbonates, polychloroprenes, perchlorinated isoprenes and butadienes, in the form of melts, as aqueous dispersions, in dilution in organic solvents, and also as liquid, 100-percent systems, and also their typical blends and customary formulations. The stated adhesives and formulations may be applied as typical hotmelt adhesives (hotmelts), permanently tacky pressure-sensitive adhesives (PSA), contact adhesives, heat-activatable adhesives, liquid reactive adhesives, either single-sidedly or double-sidedly, according to the typical mode of application. Preference is given to using adhesive components based on polyurethanes. With particular preference the adhesive component (a) comprises 2K adhesives.

Polyurethanes in the sense of this invention also include polyurethaneureas, which have both urethane groups and urea groups.

The adhesive component (a) may be in the form of an aqueous dispersion, a solution in organic solvents, or a liquid, undiluted system. The adhesive component is preferably in the form of an aqueous dispersion or a solution, and more preferably is a polyurethane-based aqueous dispersion or solution. Particular preference is given to using aqueous adhesive dispersions, more particularly those based on polyurethanes.

One preferred embodiment of the invention uses heat-activatable adhesives as adhesive component (a).

The adhesives especially preferably are based on undiluted polyurethanes, aqueous polyurethane dispersions, or polyurethane solutions in organic solvents, very preferably aqueous polyurethane dispersions or polyurethane solutions in organic solvents.

The adhesives preferably comprise polyurethanes which are reaction products of the following components:
A1) isocyanates
A2) polymeric polyols having number-average molar weights of ≥400 g/mol to ≤8000 g/mol, determined by gel permeation chromatography in tetrahydrofuran to DIN 55672-1,
A3) optionally mono- and/or polyalcohols or mono- and/or polyamines or amino alcohols having molar weights of ≤400 g/mol,
and also, optionally, at least one compound selected from
A4) compounds which have at least one ionic or potentially ionic group
and
A5) nonionically hydrophilized compounds.

A potentially ionic group is a group which is capable of forming an ionic group, by neutralization, for example.

Particularly preferred are aqueous polyurethane dispersions comprising polyurethanes (A) which are reaction products of the following components:
A1) isocyanates
A2) polymeric polyols having number-average molar weights of ≥400 g/mol to ≤8000 g/mol, determined by gel permeation chromatography in tetrahydrofuran to DIN 55672-1,
A3) optionally mono- and/or polyalcohols or mono- and/or polyamines or amino alcohols having molar weights of ≤400 g/mol,
and also at least one compound selected from
A4) compounds which have at least one ionic or potentially ionic group
and
A5) nonionically hydrophilized compounds.

The polyurethanes (A) are preferably prepared from ≥7 weight % to ≤45 weight % of A1), ≥50 to ≤91 weight % of A2), ≥0 to ≤15 weight % of A5), ≥0 to ≤12 weight % of ionic or potentially ionic compounds A4), and optionally ≥0 to ≤30 weight % of compounds A3), where the sum of A4) and A5) is ≥0.1 to ≤27 weight %, and the sum of the components adds up to 100 weight %.

The polyurethanes (A) are more preferably synthesized from ≥10 to ≤35 weight % of A1), ≥55 to ≤90 weight % of A2), ≥0 to ≤10 weight % of A5), ≥1 to ≤9 weight % of ionic or potentially ionic compounds A4), and optionally ≥0 to ≤10 weight % of compounds A3), where the sum of A4) and A5) ≥0.1 to ≤19 weight %, and the sum of the components adds up to 100 weight %.

The polyurethanes (A) are very preferably prepared from ≥15 to ≤35 weight % of A1), ≥55 to ≤75 weight % of A2), ≥0 to ≤8 weight % of A5), ≥1 to ≤5 weight % of ionic or potentially ionic compounds A4), and optionally ≥0 to ≤8 weight % of compounds A3), where the sum of A4) and A5) ≥0.1 to ≤10 weight %, and the sum of the components adds up to 100 weight %.

Suitable isocyanates (A1) are aromatic, araliphatic, aliphatic or cycloaliphatic isocyanates. Mixtures of such isocyanates may also be used.

The isocyanates are preferably isocyanates having at least two isocyanate groups per molecule, referred to hereinafter as polyisocyanates.

Examples of suitable polyisocyanates are butylene diisocyanate (BDI), pentylene diisocyanate (PDI), hexamethylene diisocyanate (HDI), isophorone diisocyanate (IPDI), 1,3-bis(isocyanatomethyl)benzene (xylylene 1,3-diisocyanate, XDI), 1,4-bis(isocyanatomethyl)benzene (xylylene 1,4-diisocyanate, XDI), 1,3-bis(1-isocyanato-1-methylethyl)benzene (TMXDI), 1,4-bis(1-isocyanato-1-methylethyl)benzene (TMXDI), 2,2,4- and/or 2,4,4-trimethylhexamethylene diisocyanate, the isomeric bis(4,4'-isocyanatocyclohexyl)methanes or mixtures thereof with any desired isomer content, isocyanatomethyloctane 1,8-diisocyanate (TIN), cyclohexylene 1,4-diisocyanate, phenylene 1,4-diisocyanate, tolylene 2,4- and/or 2,6-diisocyanate, naphthylene 1,5-diisocyanate, diphenylmethane 2,4'- or 4,4'-diisocyanate, triphenylmethane 4,4',4''-triisocyanate or derivatives thereof having urethane, isocyanurate, allophanate, biuret, uretdione, iminooxadiazinedione structure, and mixtures thereof, as described for example in J. Prakt. Chem. 336 (1994) pp. 185-200. The polyisocyanates are preferably polyisocyanates or polyisocyanate mixtures of the stated type having exclusively aliphatically and/or cycloaliphatically bonded isocyanate groups.

Particularly preferred starting components (A1) are polyisocyanates and/or polyisocyanate mixtures based on PDI, HDI, IPDI and/or 4,4'-diisocyanatodicyclohexylmethane, very preferably based on HDI and IPDI. With particular advantage, component A1 comprises a mixture of HDI and IPDI.

Suitable polymeric polyols (A2) possess an OH functionality of ≥1.5 to ≤4, such as, for example, polyacrylates, polyesters, polylactones, polyethers, polycarbonates, polyestercarbonates, polyacetals, polyolefins, and polysiloxanes. Preferred polyols are those in a number-average molar weight of ≥400 g/mol to ≤2500 g/mol and an OH functionality of ≥1.9 to ≤3. Particularly preferred polymeric polyols (A2) are polyesters, polycarbonates and/or polyethers, very preferably polyesters.

In the context of this patent application, the number-average molecular weight is always determined by gel permeation chromatography (GPC) in tetrahydrofuran (THF) at 23° C. The procedure here is in accordance with DIN 55672-1: "Gel permeation chromatography, Part 1—Tetrahydrofuran as eluent" (SECurity GPC system from PSS Polymer Service, flow rate 1.0 ml/min; columns: 2×PSS SDV linear M, 8×300 mm, 5 µm; RID detector). Polystyrene samples of known molar mass are used for the calibration here. The number-average molecular weight is calculated with software assistance. Baseline points and evaluation limits are specified in accordance with DIN 55672 Part 1.

The polycarbonates in question, containing hydroxyl groups, are obtainable by reaction of carbonic acid derivatives, as for example diphenyl carbonate, dimethyl carbonate or phosgene, with diols. Suitable such diols include, for example, ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A, and also lactone-modified diols. The diol component contains preferably ≥40 weight % to ≤100 weight % of hexanediol, preferably 1,6-hexanediol and/or hexanediol derivatives, preferably those which as well as terminal OH groups have ether groups or ester groups, as for example products obtained by reaction of 1 mol of hexanediol with at least 1 mol, preferably 1 to 2 mol, of caprolactone in accordance with DE-A 1 770 245, or by etherification of hexanediol with itself to give the di- or trihexylene glycol. The preparation of such derivatives is known for example from DE-A 1 570 540. The polyether-polycarbonate diols described in DE-A 3 717 060 can also be used.

The hydroxyl polycarbonates ought preferably to be linear. They may, however, optionally be slightly branched as a result of the incorporation of polyfunctional components, more particularly low molecular mass polyols. Suitable for this purpose, for example, are glycerol, trimethylolpropane, hexane-1,2,6-triol, butane-1,2,4-triol, trimethylolpropane, pentaerythritol, quinitol, mannitol, and sorbitol, methyl glycoside, 1,3,4,6-dianhydrohexitols.

Suitable polyether polyols are the polytetramethylene glycol polyethers which are known per se in polyurethane chemistry and which can be prepared, for example, via polymerization of tetrahydrofuran by cationic ring-opening.

Polyether polyols (A2) with further suitability are the polyaddition products, prepared using starter molecules, of ethylene oxide, propylene oxide, butylene oxide, styrene oxide or epichlorohydrin, and also their copolyaddition and graft polyaddition products, and also the polyethers obtained by condensation of polyhydric alcohols or mixtures thereof and the polyethers obtained by alkoxylation of water, polyhydric alcohols, amines or amino alcohols used. Preference is given to homopolyaddition and/or copolyaddition compounds of ethylene oxide and/or propylene oxide.

The fraction of ethylene oxide in the homopolyaddition and/or copolyaddition compounds of ethylene oxide and/or propylene oxide is 0 to 100 weight %, preferably 0 to 30 weight %, more preferably 0 to 10 weight %.

Polyester polyols are, for example, the polycondensates, known per se, of diols and also, optionally, triols and tetraols and of dicarboxylic acids and also, optionally, tricarboxylic and tetracarboxylic acids or hydroxycarboxylic acids or lactones. Instead of the free polycarboxylic acids it is also possible to use the corresponding polycarboxylic anhydrides or corresponding polycarboxylic esters of lower alcohols in order to prepare the polyesters.

Examples of diols suitable for this purpose are ethylene glycol, butylene glycol, diethylene glycol, triethylene glycol, polyalkylene glycols such as polyethylene glycol, and also 1,2-propanediol, 1,3-propanediol, butane-1,3-diol, butane-1,4-diol, hexane-1,6-diol and isomers, neopentyl glycol or neopentyl glycol hydroxypivalate. In addition it is also possible to use polyols such as trimethylolpropane, glycerol, erythritol, pentaerythritol, trimethylolbenzene or trishydroxyethyl isocyanurate.

Dicarboxylic acids which can be used are phthalic acid, isophthalic acid, terephthalic acid, tetrahydrophthalic acid, hexahydrophthalic acid, cyclohexanedicarboxylic acid, adipic acid, succinic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. The corresponding anhydrides as well can be used as an acid source.

Where the average functionality of the polyol to be esterified is greater than 2, it is also possible, additionally, for monocarboxylic acids, such as benzoic acid and hexanecarboxylic acid, to be used as well.

Hydroxycarboxylic acids, which may be used additionally as reaction participants in the preparation of a polyester polyol having terminal hydroxyl groups, are, for example, hydroxycaproic acid, hydroxybutyric acid, hydroxydecanoic acid, hydroxystearic acid, and the like. Suitable lactones are caprolactone, butyrolactone, and homologs. Preferred is caprolactone.

Preferred polyester polyols are those based on adipic acid and 1,4-butanediol and/or 1,6-hexanediol.

The components (A3) are suitable for chain extension and/or termination of the polyurethane prepolymer. For this purpose, monofunctional alcohols and monoamines are contemplated. Preferred monoalcohols are aliphatic monoalcohols having 1 to 18 carbon atoms, such as, for example, ethanol, n-butanol, ethylene glycol monobutyl ether, 2-ethylhexanol, 1-octanol, 1-dodecanol or 1-hexadecanol. Preferred monoamines are aliphatic monoamines, such as, for example, diethylamine, dibutylamine, ethanolamine, N-methylethanolamine or N,N-diethanolamine, and amines of the Jeffamine® M series (Huntsman Corp. Europe, Belgium), or amino-functional polyethylene oxides and polypropylene oxides.

Likewise suitable as component (A3) are polyols, aminopolyols or polyamines having a molar weight below 400 g/mol, which are described in large number in the corresponding literature.

Examples of preferred components (A3) are as follows:
a) alkanediols and/or -triols, such as ethanediol, 1,2- and 1,3-propanediol, 1,4- and 2,3-butanediol, 1,5-pentanediol, 1,3-dimethylpropanediol, 1,6-hexanediol, neopentyl glycol, 1,4-cyclohexanedimethanol, 2-methyl-1,3-propanediol, 2-ethyl-2-butylpropanediol, trimethylpentanediol, positionally isomeric diethyloctanediols, 1,2- and 1,4-cyclohexanediol, hydrogenated bisphenol A [2,2-bis(4-hydroxycyclohexyl)propane], 2,2-dimethyl-3-hydroxypropyl 2,2-dimethyl-3-hydroxypropionate, trimethylolethane, trimethylolpropane or glycerol, b) ether diols, such as diethylene diglycol, triethylene glycol, tetraethylene glycol, dipropylene glycol, tripropylene glycol, 1,3-butylene glycol or hydroquinone dihydroxyethyl ether, c) ester diols of the general formulae (I) and (II),

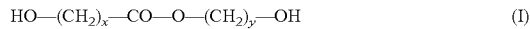

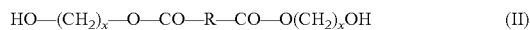

in which
R is an alkylene or arylene radical having 1 to 10 carbon atoms, preferably 2 to 6 carbon atoms,
x is 2 to 6, and
y is 3 to 5,
such as, for example, δ-hydroxybutyl-ε-hydroxycaproic ester, ω-hydroxyhexyl-γ-hydroxybutyric ester, (β-hydroxyethyl) adipate, and bis(β-hydroxyethyl) terephthalate, and d) di- and polyamines such as, for example, 1,2-diaminoethane, 1,3-diaminopropane, 1,6-diaminohexane, 1,3- and 1,4-phenylenediamine, 4,4'-diphenylmethanediamine, isophoronediamine, isomer mixture of 2,2,4- and 2,4,4-trimethyl-hexamethylenediamine, 2-methylpentamethylenediamine, diethylenetriamine, 1,3- and 1,4-xylylenediamine, α,α,α',α'-tetramethyl-1,3- and -1,4-xylylenediamine, 4,4-diaminodicyclohexylmethane, amino-functional polyethylene oxides or polypropylene oxides, which are available under the Jeffamine name, D series (from Huntsman Corp. Europe, Belgium), diethylenetriamine and triethylenetetramine. Also suitable as diamines in the sense of the invention are hydrazine, hydrazine hydrate, and substituted hydrazines, such as, for example, N-methylhydrazine, N,N'-dimethylhydrazine and homologs thereof, and also acid dihydrazides, adipic acid, β-methyladipic acid, sebacic acid, hydracrylic acid, and terephthalic acid, semicarbazido-alkylene hydrazides, such as, for example, β-semicarbazidopropionic hydrazide (for example, described in DE-A 1 770 591), semicarbazidoalkylene-carbazine esters, such as, for example, 2-semicarbazidoethyl-carbazine ester (for example, described in DE-A 1 918 504), or else aminosemicarbazide compounds, such as, for example, β-aminoethyl semicarbazido-carbonate (for example, described in DE-A 1 902 931).

The component (A4) comprises ionic groups, which may be either cationic or anionic in nature. Cationically, anionically dispersing compounds are those comprising, for example, sulfonium, ammonium, phosphonium, carboxylate, sulfonate, phosphonate groups or the groups which can be converted by salt formation into the aforesaid groups (potentially ionic groups) and can be incorporated into the macromolecules by isocyanate-reactive groups which are present. Isocyanate-reactive groups of preferred suitability are hydroxyl and amine groups.

Suitable ionic or potentially ionic compounds (A4) are, for example, mono- and dihydroxycarboxylic acids, mono- and diaminocarboxylic acids, mono- and dihydroxysulfonic acids, mono- and diaminosulfonic acids, and also mono- and dihydroxyphosphonic acids or mono- and diaminophosphonic acids and their salts, such as dimethylolpropionic acid, dimethylolbutyric acid, hydroxypivalic acid, N-(2-aminoethyl)-β-alanine, 2-(2-aminoethylamino)ethanesulfonic acid, 1,2- or 1,3-propylenediamine-β-ethylsulfonic acid, ethylenediamine-propyl- or -butyl-sulfonic acid, malic acid, citric acid, glycolic acid, lactic acid, glycine, alanine, taurine, lysine, 3,5-diaminobenzoic acid, an adduct of IPDI and acrylic acid (EP-A 0 916 647, example 1) and its alkali metal salts and/or ammonium salts; the adduct of sodium bisulfite with but-2-ene-1,4-diol, polyether sulfonate, the propoxylated adduct of 2-butenediol and NaHSO3, described for example in DE-A 2 446 440 (page 5-9, formula I-III), and also building blocks which can be converted into cationic groups, such as N-methyldiethanolamine, as hydrophilic synthesis components. Preferred ionic or potentially ionic compounds are those which possess carboxy or carboxylate and/or sulfonate groups and/or ammonium groups. Particularly preferred ionic compounds are those which contain carboxyl and/or sulfonate groups as ionic or potentially ionic groups, such as the salts of N-(2-aminoethyl)-β-alanine, of 2-(2-aminoethylamino)ethanesulfonic acid or of the adduct of IPDI and acrylic acid (EP-A 0 916 647, example 1), and also of dimethylolpropionic acid. Especially preferred are the sodium salts of N-(2-aminoethyl)-β-alanine and 2-(2-aminoethylamino)ethanesulfonic acid. Likewise especially preferred is dimethylpropionic acid. One advantageous embodiment uses not only sodium salts of N-(2-aminoethyl)-β-alanine or 2-(2-aminoethylamino)ethanesulfonic acid, but also dimethylpropionic acid.

Suitable nonionically hydrophilicizing compounds (A5) are, for example, polyoxyalkylene ethers which contain at least one hydroxy or amino group. These polyethers contain a fraction of 30 weight % to 100 weight % of building blocks derived from ethylene oxide. Suitability is possessed by polyethers having a linear construction and a functionality of between 1 and 3, but also by compounds of the general formula (III),

in which
$R^1$ and $R^2$ independently of one another are each a divalent aliphatic, cycloaliphatic or aromatic radical having 1 to 18 carbon atoms, which may be interrupted by oxygen and/or nitrogen atoms, and $R^3$ is an alkoxy-terminated polyethylene oxide radical.

Other examples of nonionically hydrophilicizing compounds include monofunctional polyalkylene oxide polyether alcohols having on average ≥5 to ≤70, preferably ≥7 to ≤55, ethylene oxide units per molecule, of the kind obtainable conventionally by alkoxylation of suitable starter molecules (for example, in Ullmanns Encyclopädie der technischen Chemie, 4th edition, volume 19, Verlag Chemie, Weinheim pp. 31-38).

Examples of suitable starter molecules are saturated monoalcohols such as methanol, ethanol, n-propanol, isopropanol, n-butanol, isobutanol, sec-butanol, the isomers of pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers such as, for example, diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols, such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine, and also heterocyclic secondary amines such as morpholine, pyrrolidine, piperidine or 1H-pyrazole. Preferred starter molecules are saturated monoalcohols. Particularly preferred for use as starter molecule is diethylene glycol monobutyl ether.

Alkylene oxides suitable for the alkoxylation reaction are, in particular, ethylene oxide and propylene oxide, which may be used in any order or else in a mixture in the alkoxylation reaction.

The polyalkylene oxide polyether alcohols are either pure polyethylene oxide polyethers or mixed polyalkylene oxide polyethers whose alkylene oxide units consist to an extent of at least 30 mol %, preferably at least 40 mol %, of ethylene oxide units. Preferred nonionic compounds are monofunctional mixed polyalkylene oxide polyethers which have at least 40 mol % of ethylene oxide units and at most 60 mol % of propylene oxide units.

For preparing the polyurethane (A) it is possible to use a combination of ionic (A4) and nonionic (A5) hydrophilizing agents. Preference is given to using ionic hydrophilizing agents.

In one particularly preferred embodiment of the method of the invention, the adhesive comprises an aqueous polyurethane dispersion comprising a polyurethane (A) which is the reaction product of a mixture of HDI and IPDI (A1), a polyester polyol, more particularly a polyester polyol formed from adipic acid and 1,4-butanediol and/or 1,6-hexanediol (A2), optionally a diol and/or diamine (A3), and the sodium salt of 2-(2-aminoethylamino)ethanesulfonic acid and/or dimethylolpropionic acid (A4).

The polyurethane (A) may be prepared in one or more stages in homogeneous phase or, in the case of multistage reaction, partially in disperse phase. After complete or partial polyaddition, there is a dispersing, emulsifying or dissolving step. This is optionally followed by a further polyaddition or modification in disperse phase.

For preparing the polyurethane (A) it is possible to use all processes known from the prior art such as emulsifier shearing force, acetone, prepolymer mixing, melt emulsifying, ketimine, and solids spontaneous dispersing processes or derivatives of these. A compilation of these methods is found in Methoden der organischen Chemie (Houben-Weyl, additional and supplementary volumes to the 4th edition, volume E20, H. Bartl and J. Falbe, Stuttgart, New York, Thieme 1987, pp. 1671-1682). Preferred is the melt emulsifying, prepolymer mixing, and the acetone process. Particularly preferred is the acetone process.

Customarily, constituents (A2) to (A5), which have no primary or secondary amino groups, and a polyisocyanate (A1) are initially charged wholly or partially to the reactor, for the preparation of a polyurethane prepolymer, and are diluted optionally with a solvent which is miscible with water but inert toward isocyanate groups, but preferably without solvent, and are heated to relatively high temperatures, preferably in the range from 50 to 120° C.

Suitable solvents are, for example, acetone, butanone, tetrahydrofuran, dioxane, acetonitrile, dipropylene glycol dimethyl ether, and 1-methyl-2-pyrrolidone, which may be added not only at the start of the preparation but also, optionally, in portions later on. Preferred are acetone and butanone. It is possible for the reaction to be carried out under atmospheric pressure or elevated pressure, as for example above the atmospheric-pressure boiling temperature of a solvent such as acetone, for example.

Furthermore, the catalysts which are known for accelerating the isocyanate addition reaction may be included in the initial charge or metered in later on, such as, for example, triethylamine, 1,4-diazabicyclo[2.2.2]octane, dibutyltin oxide, tin dioctoate, dibutyltin dilaurate, tin bis(2-ethylhexanoate), zinc dioctoate, zinc bis(2-ethylhexanoate) or other organometallic compounds.

Preferred are dibutyltin dilaurate, zinc dioctoate, and zinc bis(2-ethylhexanoate); particularly preferred is zinc bis(2-ethylhexanoate).

Subsequently, the constituents (A1), (A2), optionally (A3) and (A4) and/or (A5), which have no primary or secondary amino groups, and which were optionally not added at the start of the reaction are metered in and heated likewise to relatively high temperatures, preferably in the range from 50 to 120° C. In the preparation of the polyurethane prepolymer, the amount-of-substance ratio of isocyanate groups to isocyanate-reactive groups is ≥0.90 to ≤3, preferably ≥0.95 to ≤2.5, more preferably ≥1.05 to ≤2.0. The reaction of components (A1) to (A5) takes place partially or completely, but preferably completely, based on the total amount of isocyanate-reactive groups of the part of (A2) to (A5) that has no primary or secondary amino groups. The degree of conversion is customarily monitored by tracking of the NCO content of the reaction mixture. This can be done using spectroscopic measurements, such as infrared or near-infrared spectra or determinations of the refractive index, for example, and by chemical analyses, such as titrations, on samples taken. Polyurethane prepolymers containing free isocyanate groups are obtained in bulk or in solution.

After or during the preparation of the polyurethane prepolymers from (A1) and (A2) to (A5), if it has not been carried out in the starting molecules, the anionically and/or cationically dispersing groups undergo partial or complete salt formation. In the case of anionic groups, this is done using bases such as ammonia, ammonium carbonate or ammonium hydrogencarbonate, trimethylamine, triethylamine, tributylamine, diisopropylethylamine, dimethylethanolamine, diethylethanolamine, triethanolamine, potassium hydroxide or sodium carbonate, preferably triethylamine, triethanolamine, dimethylethanolamine or diisopropylethylamine. The amount of substance of the bases is between 50 and 120%, preferably between 50 and 100%, and more preferably between 60 and 90% of the amount of substance of the anionic groups. In the case of cationic groups, organic or inorganic acids are employed. If only nonionically hydrophilized compounds (A5) having ether groups are used, the neutralizing step is omitted. The neutralization may also take place simultaneously with the dispersion, with the dispersing water already containing the neutralizing agent.

Possible aminic components are (A2), (A3), and (A4), with which any isocyanate groups still remaining can be reacted. This chain extension may be carried out either in solvent prior to dispersing, during the dispersing, or in water after the dispersing. Where aminic components are employed as (A4), chain extension takes place preferably prior to the dispersing.

The aminic component (A3) or (A4) may be added to the reaction mixture in a form diluted with organic solvents and/or with water. Preference is given to using ≥70 weight % to ≤95 weight % of solvent and/or water. Where two or more aminic components are present, the reaction may take place in succession in any order or simultaneously by addition of a mixture.

For preparing the polyurethane dispersion, the polyurethane prepolymers, optionally with strong shearing, such as strong stirring or using a nozzle jet disperser, for example, are introduced into the dispersing water, or, conversely, the dispersing water is stirred into the prepolymers. Subsequently, if it has not taken place in the homogeneous phase, the molar mass may be increased by reaction of any isocyanate groups present with component (A2), (A3). The amount of polyamine (A2), (A3) used is dependent on the unreacted isocyanate groups still present. Preference is given to reacting ≥45 to ≤100%, more preferably ≥50 to ≤75%, of the amount of substance of the isocyanate groups with polyamines (A2), (A3).

The organic solvent may optionally be removed by distillation. The dispersions have a solids content of ≥10 to ≤70 weight %, preferably ≥25 to ≤65 weight %, and more preferably ≥30 to ≤60 weight %.

The polyurethane dispersions may be used alone or with known binders, auxiliaries, and adjuvants, more particularly light stabilizers such as UV absorbers and sterically hindered amines (HALS), and also antioxidants, fillers, and coatings auxiliaries, as for example antisettling agents, defoamers and/or wetting agents, flow control agents, reactive diluents, plasticizers, catalysts, auxiliary solvents and/or thickeners and additives, such as, for example, dispersions, pigments, dyes or matting agents. In particular, combinations with polyurethane dispersions or polyacrylate dispersions, which optionally may also be hydroxy-functional, are readily possible. The additives may be added to the PU dispersions immediately prior to processing. It is also possible, however, for at least part of the additives to be added before or during the dispersing of the binder or binder/crosslinker mixture. In one possible embodiment of the invention, the adhesive component (a) may also already comprise other crosslinking-active substances, such as carbodiimides, aziridines or peroxides, for example, which in an independent process may lead to the co-crosslinking of the adhesive component (a). The selection and the metering of these substances which may be added to the individual components and/or to the overall mixture are known to the skilled person.

Especially preferred for use as adhesive component (a) are heat-activatable, aqueous polyurethane dispersions.

The isocyanate component (b) comprises any desired organic isocyanates having aliphatically, cycloaliphatically, araliphatically and/or aromatically bonded, free isocyanate groups, which are liquid at room temperature or for that purpose are diluted with solvents. The isocyanate component (b) is preferably of low viscosity, having preferably at 23° C. a viscosity of 5 to 15000, more preferably 10 to 5000 mPas, and very preferably of 100 to 2000 mPas.

All viscosity measurements were carried out using a Physica MCR 51 rheometer from Anton Paar Germany GmbH (DE) in accordance with DIN EN ISO 3219.

The isocyanate component (b) preferably comprises isocyanates having two or more isocyanate groups, or mixtures thereof, referred to below as polyisocyanates. With particular preference the polyisocyanates are compounds having an (average) NCO functionality of between 1.5 and 5.0, more preferably from 2.0 to 4.0. With further preference the polyisocyanates have exclusively aliphatically and/or cycloaliphatically bonded isocyanate groups.

Aliphatically and cycloaliphatically bonded isocyanate groups are understood to be isocyanate groups bonded, respectively, to an aliphatic or cycloaliphatic hydrocarbon radical.

As compounds having aliphatically or cycloaliphatically bonded isocyanate groups it is possible to use not only monomeric compounds containing isocyanate groups but also polymeric modifications of these monomeric compounds, and also mixtures thereof.

Suitable monomeric compounds having aliphatically bonded isocyanate groups are any desired aliphatic polyisocyanates obtainable by phosgenation or by phosgene-free processes, as for example by thermal urethane cleavage. Preferred polyisocyanates are those of the molecular weight range 140 to 336 g/mol, such as, for example, the linearaliphatic diisocyanates 1,4-diisocyanatobutane (BDI), pentane 1,5-diisocyanate (PDI), 1,6-diisocyanatohexane (HDI), 1,3-bis(isocyanatomethyl)benzene (xylylene 1,3-diisocyanate, XDI), 1,4-bis(isocyanatomethyl)benzene (xylylene 1,4-diisocyanate, XDI), 1,3-bis(1-isocyanato-1-methylethyl)benzene (TMXDI), 1,4-bis(1-isocyanato-1-methylethyl)benzene (TMXDI), 4-isocyanatomethyloctane 1,8-diisocyanate (trisisocyanatononane (TIN)), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, and also the cycloaliphatic diisocyanates 1,3- and 1,4-diisocyanatocyclohexane, 1,4-diisocyanato-3,3,5-trimethylcyclohexane, 1,3-diisocyanato-2(4)-methylcyclohexane, 1-isocyanato-3,3,5-trimethyl-5-isocyanatomethylcyclohexane (isophorone diisocyanate, IPDI), 1-isocyanato-1-methyl-4(3)-isocyanatomethylcyclohexane, 1,8-diisocyanato-p-menthane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 4,4'- and/or 2,4'-diisocyanatodicyclohexylmethane, 4,4'-diisocyanato-3,3'-dimethyldicyclohexylmethane, 4,4'-diisocyanato-3,3',5,5'-tetramethyl-dicyclohexylmethane, 1,3-diisocyanatoadamantane, and 1,3-dimethyl-5,7-diisocyanatoadamantane, or any desired mixtures of such polyisocyanates.

The polyisocyanates advantageously comprise any desired polyisocyanates prepared by modification of aliphatic polyisocyanates and constructed from at least two monomeric compounds having aliphatically bonded isocyanate groups, and with uretdione, isocyanurate, allophanate, biuret, iminooxadiazinedione and/or oxadiazinetrione structure. Modifications of these kinds are described for example in J. Prakt. Chem. 336 (1994) 185-200, in DE-A 1 670 666, EP-A 0 798 299 and EP-A 0 649 866. Likewise suitable are polyisocyanates containing ester groups, of the kind described for example in EP0412380. Suitable monomeric starting compounds for producing the modifications include all monomeric polyisocyanates stated above, and also mixtures thereof.

Preferred for use in the context of this invention as component (b) are HDI, IPDI, 1,3-diisocyanato-2(4)-methylcyclohexane, 4,4'- and/or 2,4'-diisocyanatodicyclohexylmethane, or modifications thereof with uretdione, isocyanurate, allophanate, biuret and/or iminooxadiazinedione structure, and also mixtures of the stated compounds.

With particular preference the isocyanate component (b) comprises HDI or modifications of HDI which have uretdione, isocyanurate, allophanate, biuret and/or iminooxadiazinedione structure, or consists thereof. Very particularly the isocyanate component (b) comprises modifications of HDI which have uretdione, isocyanurate, allophanate, biuret and/or iminooxadiazinedione structure, or consists thereof.

The entirety of the compounds with isocyanate groups that are containing in the isocyanate component generally have a number-average NCO functionality of ≥1.5, preferably ≥2, more preferably ≥2.5, and very preferably ≥3.0.

The isocyanate component (b) may optionally have undergone hydrophilic modification. Water-soluble and/or water-dispersible polyisocyanates are obtainable for example by modification with carboxylate, sulfonate and/or polyethylene oxide groups and/or polyethylene oxide/polypropylene oxide groups.

Hydrophilization of the polyisocyanates is possible for example through reaction with deficit amounts of monohydric, hydrophilic polyether alcohols. The preparation of hydrophilized polyisocyanates of this kind is described for example in EP-A 0 540 985, page 3, line 55-page 4 line 5. Also highly suitable are the polyisocyanates containing allophanate groups that are described in EP-A-0 959 087, page 3 lines 39-51, which are prepared by reaction of polyisocyanates with low monomer content with polyethylene oxide polyether alcohols under allophanatization conditions. Also suitable are the water-dispersible polyisocyanate mixtures, based on triisocyanatononane, that are described in DE-A 10 007 821, page 2 line 66-page 3 line 5, and also polyisocyanates hydrophilized with ionic groups (sulfonate groups, phosphonate groups), as are described for example in DE 10 024 624, page 3 lines 13-33, or else in WO 01/88006. Also possible is external hydrophilization through addition of emulsifiers.

In the case of so-called polyether allophanates (hydrophilization by means of a polyether), for example, the NCO content of the polyisocyanate component (b) used may range from 5-25 weight %. In the case of hydrophilization with sulfonic acid groups, NCO contents of 4-26 weight % may be achieved; these numbers should be understood only by way of example.

The isocyanate components used may also be blocked partially—for example, at up to one third of the isocyanate groups present—with components that are reactive toward isocyanates. In this case, in a later step, there may be reaction of the blocked isocyanate component with further polyol in order to bring about further crosslinking.

Examples of suitable blocking agents for these polyisocyanates are monohydric alcohols such as methanol, ethanol, butanol, hexanol, cyclohexanol, benzyl alcohol, oximes such as acetoxime, methyl ethyl ketoxime, cyclohexanone oxime, lactams such as ε-caprolactam, phenols, amines such as diisopropylamine or dibutylamine, dimethylpyrazole or triazole, and also dimethyl malonate, diethyl malonate or dibutyl malonate.

Preference is given to using low-viscosity, hydrophobic or hydrophilized polyisocyanates having free isocyanate groups, based on aliphatic, cycloaliphatic, araliphatic and/or aromatic isocyanates, more preferably on aliphatic or cycloaliphatic isocyanates.

The method of the invention is carried out preferably as follows:

At least one adhesive component (a) and at least one isocyanate component (b) are applied between at least two substrates (step I) and subsequently the coated substrates are pressed against one another by the coated side or sides, optionally after activation of the adhesive component by exposure to heat (step II). Heat activation of adhesives may be necessary only when the adhesive component is not tacky at room temperature. Heat activation may, for example, bring about melting or else decrystallization, or may generally lower the viscosity of an adhesive component to an extent such that, on exposure to pressure, it is possible for wetting and bonding of the components to be bonded to take place. The suitable viscosities typical for this purpose are well known to the skilled person (for example, from *Classification of PSAs by the viscoelastic window*, the so called Chang window, proposed by E. P. Chang, *J. Adhes.* 34, 189 (1991)).

The inventive application of the adhesive component and the isocyanate component is notable for the fact that the two components are not, as is customary in the prior art, mixed with one another before or during application, but instead that they are applied separately from one another. The components in this case preferably only come into contact with one another on the substrate. Here, the components may be applied simultaneously or with a temporal offset from one another. Either the adhesive component (a) or else the isocyanate component (b) may be the first component applied to the substrate. The other component in each case, accordingly, is applied thereafter.

Where the adhesive component (b) is present in the form of a solution or dispersion, the solvent or the dispersing medium must be removed from it prior to step II), and it must therefore be dried.

In one embodiment, the adhesive component (a) and the isocyanate component (b) are applied simultaneously to the substrate.

In a further embodiment, the adhesive component (a) and the isocyanate component (b) are applied in offset locations to the substrate. This would mean that the two components are not applied to the same position, but are in contact at one interface at least.

In one preferred embodiment, the isocyanate component is applied separately and subsequently to the adhesive component which has already been applied. In this case, on application of the isocyanate component (b), the previously applied adhesive component (a) may still be liquid, may already have undergone partial drying, or may even be completely dried and optionally crystallized.

In one particularly preferred embodiment, the isocyanate component is applied separately and subsequently to the adhesive component which has already been applied, has already dried and is optionally in crystallized form. Dried here means at least partially dried, but preferably completely dried.

This has the advantage that in the case of heat-activatable adhesives, for example, the application of the layer of adhesive and also the complete drying thereof may take place completely separately, both in time and in space, from the application of the isocyanate component. Warehousing of a substrate coated with the adhesive component is therefore possible.

Since the dried adhesive component (a) behaves analogously to a 1K hotmelt or dried 1K solvent-based adhesive, this procedure is suitable for a multiplicity of suitable pre-applied 1K adhesives, which in principle are also co-crosslinkable with isocyanates.

The adhesive component (a) is preferably a heat-activatable adhesive which is dried and heat-activated after application. Bonding takes place after the application of the isocyanate component (b), through the pressurized compressing of the two substrates in the heat-activated state of the adhesive.

In one advantageous embodiment of the method of the invention, therefore, the adhesive component (b) is heat-activated prior to step II).

In the case of heat-activatable adhesives, the activation of the layer of adhesive may take place shortly before the application of the isocyanate component, or else the isocyanate component is applied prior to heat activation, and the system as a whole is heat-activated subsequently.

In one preferred embodiment, the adhesive component is applied to both substrates that are to be joined.

In one particularly preferred embodiment of the invention, in step I), the adhesive component is first applied to both substrates, and then the isocyanate component is applied to the adhesive component at least on one substrate. After that, the substrates may be compressed under pressure. The isocyanate component (b) is preferably applied at least to part of the adhesive component (a). The isocyanate component (b) is applied preferably to at least 5%, or preferably to at least 10%, or preferably to at least 20% of the surface area of the adhesive component (a) which is not in contact with the substrate. The isocyanate component may be applied either directly after the drying of the adhesive component (a) or else not until after minutes, hours, days, weeks, months or even years after the drying. The isocyanate component is preferably applied to the adhesive component (a) while the latter is still wet.

The adhesive component (a) may be applied as a layer, preferably from dispersion or solution. The layer after drying preferably has a thickness of 0.1 to 2000 µm, more preferably of 1 to 300 µm, and very preferably of 5 to 200 µm. It is also possible for two or more layers to be applied. In that case the isocyanate component may be applied to one or more of the layers.

In one preferred embodiment, in a step 0) before step I), the isocyanate component (b) is further applied to at least one part of at least one of the two substrates.

The adhesive component is applied either over the full area or in sub-regions to the isocyanate component and/or to at least one substrate.

The isocyanate component is likewise applied either over the full area or in sub-regions to the adhesive component and/or to at least one substrate.

In one preferred embodiment of the method of the invention, the isocyanate component (b) is applied in sub-regions to the adhesive component (a).

Used per 100 parts by weight of the adhesive component (a) (solids content) are preferably ≥0.5 and ≤30 parts by weight of the isocyanate component (b) (solids content), or preferably ≥1 and ≤15 parts by weight of the isocyanate component (b), or preferably ≥1.5 and ≤10 parts by weight of the isocyanate component (b).

In one preferred embodiment of the method of the invention, ≥0.1 and ≤30 parts by weight of the isocyanate component (b) (solids content) are employed per 100 parts by weight of the adhesive component (a) (solids content), more preferably ≥0.2 and ≤25 parts by weight of the isocyanate component (b), or preferably ≥0.5 and ≤20 parts by weight of the isocyanate component (b), or preferably ≥1.0 and ≤15 parts by weight of the isocyanate component (b).

The adhesive component (a) and the isocyanate component (b) may be applied identically or differently. Suitable application methods include all common application methods for liquid materials. These include, by way of example: spraying, knifecoating, brushing, rolling, flooding, roller coating, extruding, dispensing, and printing.

At least the isocyanate component (b) is advantageously printed. In this way it can be applied with positional accuracy and in a targeted way, in any desired patterns, to the adhesive component.

For the bonding of the substrates, they are pressed against one another preferably for a time of 0.1 to 600 seconds at a temperature of −20 to 180° C. and a pressure of 0.05 to 50 bar, more preferably for a time of 1 to 120 seconds at a temperature of 10 to 150° C. and a pressure of 0.1 to 20 bar, and very preferably for a time of 2 to 60 seconds at a temperature of 20 to 120° C. and a pressure of 0.5 to 10 bar.

The method of the invention is suitable for the adhesive bonding of any desired substrates. Suitable examples include paper, cardboard, wood, metal, leather, synthetic leather, rubber materials, any desired plastics, such as, among others, polyurethane-based plastics and foams thereof, and also homopolymers or copolymers of vinyl chloride. The substrate may also comprise textiles or film materials.

The method of the invention is suitable, for example, for producing parts of a footwear item, a textile assembly, a furniture item, a film coating and/or an item of vehicle interior trim by means of adhesive bonding.

The adhesive bonds produced by the method of the invention preferably have a softening point of ≥65° C., or preferably of ≥85° C. and very preferably of ≥100° C.

The adhesive bonds produced by the method of the invention preferably have a softening point which is >3° C., or preferably >5° C. or preferably >10° C., or preferably >15° C. higher than the softening point of an adhesive bond based on the adhesive component a).

A further subject of the invention is an assembly obtainable by the method of the invention.

A feature of the assemblies produced in accordance with the invention in the adhesive bonding of two substrates is that the layer of adhesive between the substrates is interspersed at least sectionally with a polyurea- and/or polyurethanepolyurea-containing network varying in density.

This distinguishes the assemblies significantly from the assemblies obtainable by the methods known in the prior art. As a result of the preliminary mixing of the components, these assemblies have a homogeneous polyurea- and/or polyurethanepolyurea-containing network over the entire layer of adhesive.

The concentration of urethane groups and/or urea groups in the contact regions of component a) and component b) is higher by at least 5 weight %, preferably by at least 7 weight %, or preferably by at least 10 weight %, than in the rest of the assembly material. Contact region in accordance with the invention refers to a region of at most 5 micrometers, preferably at most 1 micrometer, or preferably at most 0.5 micrometer along the contact surface of component a) and component b). In the case of a sandwich structure wherein two or more layers of component a) and component b) are applied one to the other, correspondingly, there will be more contact regions.

A further subject of the invention is therefore an assembly comprising at least two substrates joined by a layer of adhesive disposed between the substrates, characterized in that the layer of adhesive is interspersed at least sectionally with a polyisocyanurate and/or polyurea and/or polyurethane network varying in density.

With regard to the nature of the layer of adhesive, the advantageous embodiments and details specified above for the adhesive component (a) are applicable.

The polyisocyanurate and/or polyurea and/or polyurethane network comes about preferably through the reaction of the adhesive component with the isocyanate component (b), for which likewise the above-stated details and advantageous embodiments are applicable analogously.

The assembly of the invention is preferably characterized in that the layer of adhesive is based on an adhesive component which is heat-activatable.

With further preference, the assembly of the invention is characterized in that the layer of adhesive is based on an adhesive component which is an aqueous polyurethane dispersion.

The layer of adhesive in the assembly of the invention preferably has a softening point of ≥65° C., or preferably of ≥85° C. and very preferably of ≥100° C.

The adhesive layer of the assembly of the invention preferably has a softening point which is >3° C., or preferably >5° C. or preferably >10° C., or preferably >15° C. higher than the softening point of an adhesive layer based on an adhesive layer consisting of adhesive component a). Examples of suitable substrates are paper, cardboard, wood, metal, leather, synthetic leather, rubber materials, any desired plastics, such as, among others, polyurethane-based plastics and foams thereof, and also homopolymers or copolymers of vinyl chloride. The substrate may also comprise textile materials and/or film materials.

The assembly of the invention comprises, for example, parts of a footwear item, a textile assembly, a furniture item, a film coating and/or a vehicle interior trim item.

Examples

Methods and Materials Used:
Softening Point Determination:
The test specimen is suspended in an oven and loaded with a weight of 4 kg, and the oven is heated to 40° C. After a residence time of 20 minutes at 40° C., the oven is heated up with a temperature ramp of 0.5° C./min. The temperature at which the adhesive bond parts is the softening point.

Desmodur® N3600 solvent-free polyisocyanurate based on HDI from Covestro Deutschland AG;

Desmodur® DN solvent-free, hydrophilically modified, aliphatic polyisocyanate based on HDI from Covestro Deutschland AG, Leverkusen;

Dispercoll® U 54 aqueous polyurethane dispersion from Covestro Deutschland AG, Leverkusen; solids content 50 weight %; isocyanate-reactive polymer composed of linear polyurethane chains based on a polyester polyol with HDI/IPDI as isocyanate component;

Dispercoll® U XP 2643 aqueous, anionically hydrophilized dispersion of a high molecular mass, noncrystallizing polyurethane from Covestro Deutschland AG, Leverkusen;

Desmocoll® 540/5 largely linear, highly crystallizing, elastic hydroxypolyurethane from Covestro Deutschland AG, Leverkusen, employed as a 15% strength solution in 2-butanone (2-butanone from Deutsche Shell GmbH);

Butyl acetate (BA) butyl acetate 98/100 from Azelis, Antwerp.

Unless otherwise mentioned, the raw materials were employed without further purification or pretreatment.

Borchi® Gel L 75 N (Borchigel thickener) a polyurethane-based thickener from Borchers GmbH, Germany Procedure:

An approximately 200 μm layer of the adhesive dispersion, of the mixture of adhesive dispersion with the respective polyisocyanate, of the adhesive solution, or of the mixture of adhesive solution and the respective polyisocyanate was applied by brush to two PVC strips (width 20 mm, length 50 mm, height 4 mm) which had been cleaned with isopropanol, application taking place in each case over 1 cm of the strip which was 2 cm wide. The mixtures of the components were mixed prior to application and processed within their pot life (the pot life of a 2-component adhesive mixture is defined as the time taken for the viscosity of the blend to double or the time of a preliminary reaction leading to a reduction in the initial strength of the bond by >50%).

In the case of separate application of the isocyanate component, application was made by digital printer (Dimatix DMP 2831, print head DMC-11610 (16 nozzles and a nominal droplet size of 10 pl)) either to the layer of adhesive fully dried beforehand, or else to the wet layer of adhesive directly after its application. Unless described otherwise in the table, drying then took place at RT for 1 h. The crystalline layers of adhesive were subsequently thermoactivated using an IR lamp (Funck A 2000 shock activator) (10 sec=>adhesive temperature approximately 90° C.). In the case of the solvent-containing, amorphous systems, which are tacky already at room temperature, no thermoactivation was carried out. The prepared PVC strips (test specimens) were placed one atop another by the adhesive faces in such a way that the untreated ends point away from one another in a line. The test specimen was subsequently compressed using a press for 1 minute at 4 bar (except where indicated otherwise in table 1). The test specimen produced was stored under ambient conditions for 3 days, after which the softening point measurement was carried out. The results are set out in table 1.

It is apparent that with the method according to the invention, adhesive bonds having a softening point at the same level or only a slightly lower level than that of a premixed 2K adhesive system were achievable.

TABLE 1

| Example | Adhesive coating and application | Description/remarks | Softening point |
|---|---|---|---|
| 1 (comparative) | Dispercoll ® U54, about 200 g/m² | 1K, no polyisocyanate | 60° C. |
| 2 (comparative) | Dispercoll ® U54, about 200 g/m² + Desmodur ® DN, about 8 g/m², premixed | Standard for thermoactivatable aqueous 2K adhesive (2K standard) with hydrophilized polyisocyanate. The components were mixed prior to application. Desmodur ® DN was used neat. | 108° C. |
| 3 (comparative) | Dispercoll ® U54, about 200 g/m² + Desmodur ® N3600, 70% in BA, about 10 g/m², premixed | 2K adhesive with hydrophobic polyisocyanate. The components were mixed prior to application. | 107° C. |

TABLE 1-continued

| Example | Adhesive coating and application | Description/remarks | Softening point |
|---|---|---|---|
| 4 | Dispercoll ® U54, about 200 g/m² + Desmodur ® DN, 70% in BA, about 10 g/m², Desmodur ® DN applied subsequently to the wet layer | The softening point is at the same level as for the premixed system | 109° C. |
| 5 | Dispercoll ® U54, about 200 g/m² + Desmodur ® N3600, about 10 g/m², Desmodur ® N3600 applied subsequently to the wet layer | The softening point is at the same level as for the premixed system | 108° C. |
| 6 | Dispercoll ® U54, about 200 g/m² + Desmodur ® DN, 70% in BA, about 2 g/m², Desmodur ® DN applied subsequently to the wet layer | The softening point is at a slightly lower level in comparison to the premixed system | 96° C. |
| 7 | Dispercoll ® U54, about 200 g/m² + Desmodur ® DN, 70% in BA, about 4 g/m², Desmodur ® DN applied subsequently to the wet layer | On application of 2% Desmodur ® DN, 70% in BA, based on the amount of Dispercoll ® U54 applied, the softening point achieves the level of the 2K standard | 108° C. |
| 8 | Dispercoll ® U54, about 200 g/m² + Desmodur ® DN, 70% in BA, about 6 g/m², Desmodur ® DN applied subsequently to the wet layer | The softening point is at the same level as for the premixed system | 107° C. |
| 9 | Dispercoll ® U54, about 200 g/m² + Desmodur ® DN, 70% in BA, about 20 g/m², Desmodur ® DN applied subsequently to the wet layer | On application of 10% Desmodur ® DN, 70% in BA, based on the amount of Dispercoll ® U54 applied, the softening point achieves the level of the 2K standard | 109° C. |
| 10 | Dispercoll ® U54, about 200 g/m² + Desmodur ® DN, 70% in BA, about 10 g/m², Desmodur ® DN applied subsequently to the layer dried beforehand at RT for 1 h | Even on application of the polyisocyanate to the dried, thermoplastic layer of adhesive, the softening point is at the same level as the 2K standard | 108° C. |
| 11 | Dispercoll ® U54, about 200 g/m² + Desmodur ® DN, 70% in BA, about 10 g/m², Desmodur ® DN applied subsequently to the wet layer Pressing pressure 0.1 bar instead of 4 bar | At a pressing pressure of only 0.1 bar, the softening point is somewhat below the level of the 2K standard. | 97° C. |
| 12 | Dispercoll ® U54, about 200 g/m² + Desmodur ® DN, 70% in BA, about 10 g/m², Desmodur ® DN applied subsequently to the wet layer, Pressing pressure 0.5 bar instead of 4 bar | At a pressing pressure of only 0.5 bar, the softening point is at the same level as for the 2K standard. | 106° C. |
| 13 | Dispercoll ® U54, about 200 g/m² + Desmodur ® DN, 70% in BA, about 10 g/m², Desmodur ® DN applied subsequently to the layer dried beforehand at RT for 1 h, without drying after application of the polyisocyanate, Pressing pressure 0.1 bar instead of 4 bar | At a pressing pressure of only 0.1 bar, the softening point is somewhat below the level of the 2K standard. | 96° C. |
| 14 | Dispercoll ® U54, about 200 g/m² + Desmodur ® DN, 70% in BA, about 10 g/m², Desmodur ® DN applied subsequently to the layer dried beforehand at RT for 1 h, without drying after | At a pressing pressure of 0.5 bar, the softening point is at the same level as for the 2K standard. | 108° C. |

TABLE 1-continued

| Example | Adhesive coating and application | Description/remarks | Softening point |
|---|---|---|---|
| | application of the polyisocyanate, Pressing pressure 0.5 bar instead of 4 bar | | |
| 15 | Dispercoll ® U54, about 200 g/m², drying overnight (about 20 h) + Desmodur ® DN, 70% in BA, about 10 g/m² Desmodur ® DN applied subsequently to the layer dried beforehand, without drying after application of the polyisocyanate | Drying of the dispersion layer over 20 h before application of the polyisocyanate is also possible. The softening point is at the same level as for the 2K standard. | 108° C. |
| 16 | Dispercoll ® U54, about 200 g/m², 1 h at RT drying + 2nd application Dispercoll ® U54, about 200 g/m², drying 1 h at RT + 3rd application Dispercoll ® U54, about 200 g/m², drying overnight (about 20 h) + Desmodur ® DN, 70% in BA, about 30 g/m² Desmodur ® DN applied subsequently to the layers dried beforehand, without drying after application of the polyisocyanate | In the case of three-fold application of the adhesive dispersion and also a tripling of the amount of polyisocyanate applied (ratio of Dispercoll U54 to Desmodur DN approximately constant), the softening point attains the level of the 2K standard. | 107° C. |
| 17 (comparative) | Dispercoll ® U XP2 643, about 200 g/m² + Desmodur ® DN, about 8 g/m², premixed, 1 h RT drying, pressed without thermoactivation | Standard for 2K adhesives tacky at RT with neat hydrophilized polyisocyanate. The components were mixed prior to application. | 90° C. |
| 18 | Dispercoll ® U XP 2643, about 200 g/m² + Desmodur ® DN, 70% BA, about 10 g/m², applied individually in succession, wet on wet, 1 h RT drying, pressed without thermoactivation | Same level as variant mixed beforehand (example 17) | 88° C. |
| 19 (comparative) | Desmocoll ® 540, about 200 g/m², 1K system without co-reactant | Standard for solvent-containing adhesives without polyisocyanate | 82° C. |
| 20 (comparative) | Desmocoll ® 540, about 200 g/m² + Desmodur ® DN, about 8 g/m², premixed | Standard, solvent-containing 2K adhesives with hydrophilized polyisocyanate. The components were mixed prior to application. The Desmodur ® DN was used neat. | 108° C. |
| 21 | Desmocoll ® 540, about 200 g/m² + Desmodur ® DN, 70% in BA, about 10 g/m², Desmodur ® DN applied subsequently to the wet layer | The softening point is at the same level as for the premixed system (example 20) | 106° C. |
| 22 (comparative) | Dispercoll ® U54, about 200 g/m² + 1 g Borchigel thickener, mixed and stored for 24 h at RT in a closed vessel + Desmodur ® DN 70% in BA, about 0.11 g/m², premixed | Standard for thermoactivatable, aqueous 2K adhesives (2K standard) with hydrophilized polyisocyanate. The components were mixed prior to application. Desmodur ® DN was used as a 70% solution in BA. The small amounts of isocyanate do not result in a sufficiently high softening point | 70° C. |
| 23 (comparative) | Dispercoll ® U54, about 200 g/m² + 1 g Borchigel | Standard for thermoactivatable, aqueous | 72° C. |

TABLE 1-continued

| Example | Adhesive coating and application | Description/remarks | Softening point |
|---|---|---|---|
| | thickener, mixed and stored for 24 h at RT in a closed vessel + Desmodur ® DN 70% in BA, about 0.25 g/m², premixed | 2K adhesives (2K standard) with hydrophilized polyisocyanate. The components were mixed prior to application. Desmodur ® DN was used as a 70% solution in BA. The small amounts of isocyanate do not result in a sufficiently high softening point | |
| 24 (comparative) | Dispercoll ® U54, about 200 g/m² + 1 g Borchigel thickener, mixed and stored for 24 h at RT in a closed vessel + Desmodur ® DN 70% in BA, about 0.5 g/m², premixed | Standard for thermoactivatable, aqueous 2K adhesives (2K standard) with hydrophilized polyisocyanate. The components were mixed prior to application. Desmodur ® DN was used as a 70% solution in BA. The small amounts of isocyanate do not result in a sufficiently high softening point | 74° C. |
| 25 (comparative) | Dispercoll ® U54, about 200 g/m² + 1 g Borchigel thickener, mixed and stored for 24 h at RT in a closed vessel + Desmodur ® DN 70% in BA, about 1 g/m², premixed | Standard for thermoactivatable, aqueous 2K adhesives (2K standard) with hydrophilized polyisocyanate. The components were mixed prior to application. Desmodur ® DN was used as a 70% solution in BA. The small amounts of isocyanate do not result in a sufficiently high softening point | 76° C. |
| 26 (comparative) | Dispercoll ® U54, about 200 g/m² + 1 g Borchigel thickener, mixed and stored for 24 h at RT in a closed vessel + Desmodur ® DN 70% in BA, about 1.5 g/m², premixed | Standard for thermoactivatable, aqueous 2K adhesives (2K standard) with hydrophilized polyisocyanate. The components were mixed prior to application. Desmodur ® DN was used as a 70% solution in BA. The small amounts of isocyanate do not result in a sufficiently high softening point | 75° C. |
| 27 (comparative) | Dispercoll ® U54, about 200 g/m² + 1 g Borchigel thickener, mixed and stored for 24 h at RT in a closed vessel + Desmodur ® DN 70% in BA, about 2 g/m², premixed | Standard for thermoactivatable, aqueous 2K adhesives (2K standard) with hydrophilized polyisocyanate. The components were mixed prior to application. Desmodur ® DN was used as a 70% solution in BA. | 104° C. |
| 28 (comparative) | Dispercoll ® U54, about 200 g/m² + 1 g Borchigel thickener, mixed and stored for 24 h at RT in a closed vessel + Desmodur ® DN 70% in BA, about 10 g/m², premixed | Standard for thermoactivatable, aqueous 2K adhesives (2K standard) with hydrophilized polyisocyanate. The components were mixed prior to application. Desmodur ® DN was used as a 70% solution in BA. | 114° C. |
| 29 (comparative) | Dispercoll ® U54, about 200 g/m² + 1 g Borchigel thickener, mixed and stored | Standard for thermoactivatable, aqueous 2K adhesives | 68° C. |

TABLE 1-continued

| Example | Adhesive coating and application | Description/remarks | Softening point |
|---|---|---|---|
| | for 24 h at RT in a closed vessel without admixture of Desmodur ® DN | (2K standard) with hydrophilized polyisocyanate. The components were mixed prior to application. | |
| 30 | Dispercoll ® U54, about 200 g/m² + Desmodur ® DN, 70% in BA, about 0.11 g/m², Desmodur ® DN applied subsequently wet on wet | The softening point on application of the polyisocyanate to the wet layer of adhesive is at a higher level than the premixed 2K standard | 73° C. |
| 31 | Dispercoll ® U54, about 200 g/m² + Desmodur ® DN, 70% in BA, about 0.25 g/m², Desmodur ® DN applied subsequently wet on wet | The softening point on application of the polyisocyanate to the wet layer of adhesive is at a much higher level than the premixed 2K standard | 100° C. |
| 32 | Dispercoll ® U54, about 200 g/m² + Desmodur ® DN, 70% in BA, about 0.5 g/m², Desmodur ® DN applied subsequently wet on wet | The softening point on application of the polyisocyanate to the wet layer of adhesive is at a much higher level than the premixed 2K standard | 108° C. |
| 33 | Dispercoll ® U54, about 200 g/m² + Desmodur ® DN, 70% in BA, about 1 g/m², Desmodur ® DN applied subsequently wet on wet | The softening point on application of the polyisocyanate to the wet layer of adhesive is at a much higher level than the premixed 2K standard | 105° C. |
| 34 | Dispercoll ® U54, about 200 g/m² + Desmodur ® DN, 70% in BA, about 1.5 g/m², Desmodur ® DN applied subsequently wet on wet | The softening point on application of the polyisocyanate to the wet layer of adhesive is at a much higher level than the premixed 2K standard | 107° C. |
| 35 | Dispercoll ® U54, about 200 g/m² + Desmodur ® DN, 70% in BA, about 2 g/m², Desmodur ® DN applied subsequently wet on wet | The softening point on application of the polyisocyanate to the wet layer of adhesive is at a slightly higher level than the 2K standard | 107° C. |
| 36 | Dispercoll ® U54, about 200 g/m² + Desmodur ® DN, 70% in BA, about 10 g/m², Desmodur ® DN applied subsequently wet on wet | The softening point on application of the polyisocyanate to the wet layer of adhesive is at a comparable level to the 2K standard | 110° C. |

An unexpectedly significant increase in the softening point was observable in the case of the inventively applied layers of adhesive composed of adhesive component (a) and isocyanate component (b), as is clearly evident in the comparison with premixed adhesive mixtures composed of adhesive component (a) and isocyanate component (b). For the use just of more than 0.2 part to less than 0.5 part of isocyanate component (b) to 100 parts of adhesive component (a), it was possible to raise the softening point by more than 20° C. in comparison to the softening point of a premixed 2K adhesive mixture.

The invention claimed is:

1. A method for adhesively bonding substrates, consisting of the following steps:
   I) at least one adhesive component (a) and at least one isocyanate component (b) are applied between at least two substrates, optionally wherein the applied adhesive component (a) is in dried and optionally crystallized form before the isocyanate component (b) is applied, and optionally wherein the adhesive component (a) is heat-activated before step II);
   II) the substrates are pressed against one another;
   wherein in step I) the adhesive component and the isocyanate component are applied separately to at least one of the substrates, and wherein isocyanate component (b) is applied separately and subsequently to adhesive component (a) already applied, and wherein in step I) first the adhesive component (a) is applied to the at least two substrates and then the isocyanate component (b) is applied to the adhesive component (a) on at least one of the substrates.

2. The method of claim 1, wherein the applied adhesive component (a) is in dried and optionally crystallized form before the isocyanate component (b) is applied.

3. The method of claim 1, wherein the adhesive component (a) is heat-activated before step II).

4. The method of claim 1, wherein the isocyanate component (b) is applied in sub-regions to the adhesive component (a).

5. The method of claim 1, wherein the adhesive component (a) is based on polyurethane.

6. The method of claim 1, wherein adhesive component (a) comprises an aqueous polyurethane dispersion or a polyurethane solution in organic solvents.

7. The method of claim 1, wherein the isocyanate component (b) has exclusively aliphatically and/or cycloaliphatically bonded isocyanate groups.

8. The method of claim 1, wherein the isocyanate component (b) comprises hexamethylene diisocyanate (HDI) or modifications of HDI which have uretdione, isocyanurate, allophanate, biuret and/or iminooxadiazinedione structure.

9. The method of claim 1, wherein ≥0.5 and ≤30 parts by weight of the isocyanate component (b) (solids content) are used per 100 parts by weight of the adhesive component (a) (solids content).

10. The method of claim 1, wherein ≥0.1 and ≤30 parts by weight of the isocyanate component (b) (solids content) are used per 100 parts by weight of the adhesive component (a) (solids content).

* * * * *